US012380380B1

(12) United States Patent
Royer et al.

(10) Patent No.: US 12,380,380 B1
(45) Date of Patent: Aug. 5, 2025

(54) INTELLIGENT SCHEDULE MANAGEMENT AND ZONE MONITORING SYSTEM

(71) Applicant: Performance Time, LLC, Leawood, KS (US)

(72) Inventors: Cory Royer, Cape Coral, FL (US); Molly Pomeroy, Lee's Summit, MO (US); Merrill Winston, Coral Springs, FL (US); Tony Ali, Leawood, KS (US)

(73) Assignee: Performance Time, LLC, Leawood, KS (US)

( * ) Notice: Subject to any disclaimer, the term of this patent is extended or adjusted under 35 U.S.C. 154(b) by 0 days.

(21) Appl. No.: 18/646,216

(22) Filed: Apr. 25, 2024

(51) Int. Cl.
*G06Q 10/0631* (2023.01)
*G06Q 20/06* (2012.01)
*G06V 40/20* (2022.01)

(52) U.S. Cl.
CPC ..... *G06Q 10/06311* (2013.01); *G06Q 20/065* (2013.01); *G06V 40/20* (2022.01)

(58) Field of Classification Search
None
See application file for complete search history.

(56) References Cited

U.S. PATENT DOCUMENTS

| | | | | |
|---|---|---|---|---|
| 2012/0116851 A1* | 5/2012 | Hickey | ................ | G06Q 10/105 705/7.39 |
| 2014/0104062 A1* | 4/2014 | Weiner | ................ | G08B 21/245 340/573.1 |
| 2015/0156567 A1* | 6/2015 | Oliver | ................ | G08B 21/0227 340/870.07 |
| 2017/0041454 A1* | 2/2017 | Nicholls | ............. | H04M 15/888 |
| 2019/0385113 A1* | 12/2019 | Dumitras | ................ | G07C 1/10 |
| 2020/0065781 A1* | 2/2020 | Scott | .................... | G06Q 20/123 |
| 2020/0090148 A1* | 3/2020 | Lawrence | ............ | G06Q 20/229 |
| 2020/0193469 A1* | 6/2020 | McGuire | ............ | G06Q 30/0226 |
| 2022/0026886 A1* | 1/2022 | Murakami | ............. | G06Q 50/04 |
| 2022/0027830 A1* | 1/2022 | Mouawad | .......... | G06Q 10/0639 |
| 2022/0051807 A1* | 2/2022 | Subramanian | ......... | G06N 20/00 |

(Continued)

OTHER PUBLICATIONS

Carrotology website. "About Us" page. Retrieved from [URL: https://carrotology.com/about-us/] on Aug. 10, 2024. (Year: 2024).*

(Continued)

*Primary Examiner* — Susanna M. Diaz
(74) *Attorney, Agent, or Firm* — Erise IP, P.A.

(57) ABSTRACT

Systems, methods, and computer-readable media for user management. A system may include a behavior management module operable to receive an input associated with a behavior of the user. The behavior management module may include a plurality of zones associated with the behaviors of the user. A system may include a schedule management module operable to present the user with a plurality of tasks. The tasks may include items to be completed by the user. A system may include an incentive module including a set of currency associated with an account of the user. A system may include a beacon device located in an environment occupied by the user. The beacon device may be operable for monitoring and indicating system status changes to the user. A system may include a graphical user interface operable to present an application associated with the system to the user.

20 Claims, 6 Drawing Sheets

(56) References Cited

U.S. PATENT DOCUMENTS

| | | | |
|---|---|---|---|
| 2023/0128945 A1* | 4/2023 | Khan | G06Q 20/381 |
| | | | 705/14.39 |
| 2023/0267490 A1* | 8/2023 | Palmieri | G06F 3/04815 |
| | | | 705/14.12 |
| 2024/0198234 A1* | 6/2024 | Hernandez | A63F 13/216 |

OTHER PUBLICATIONS

Brili [online]. Systematically boost dopamine and get things done. Brili GmbH 2024 [retrieved on Jul. 29, 2024]. Retrieved from the Internet: https://brili.com/.

Joon [online]. The behavior improvement app for kids, Joon 2024 [retrieved on Jul. 29, 2024]. Retrieved from the Internet: https://www.joonapp.io/.

Thumsters [online]. Thumsters Parenting App—Ditch the star chart [retrieved on Jul. 29, 2024]. Retrieved from the Internet:https://www.thumsters.com/.

* cited by examiner

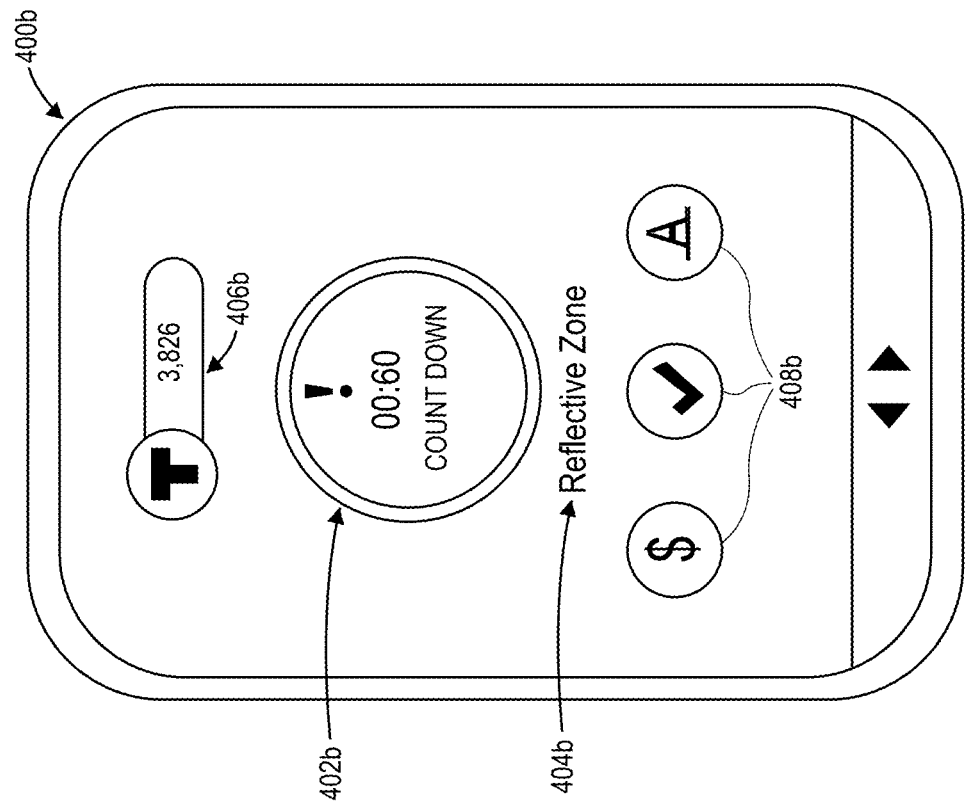
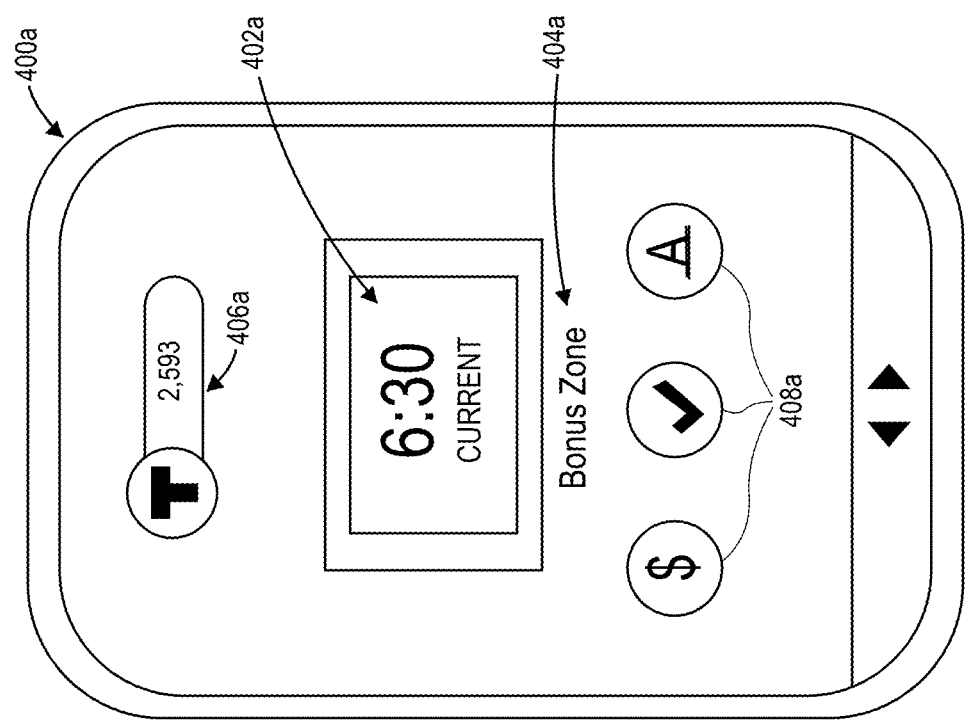

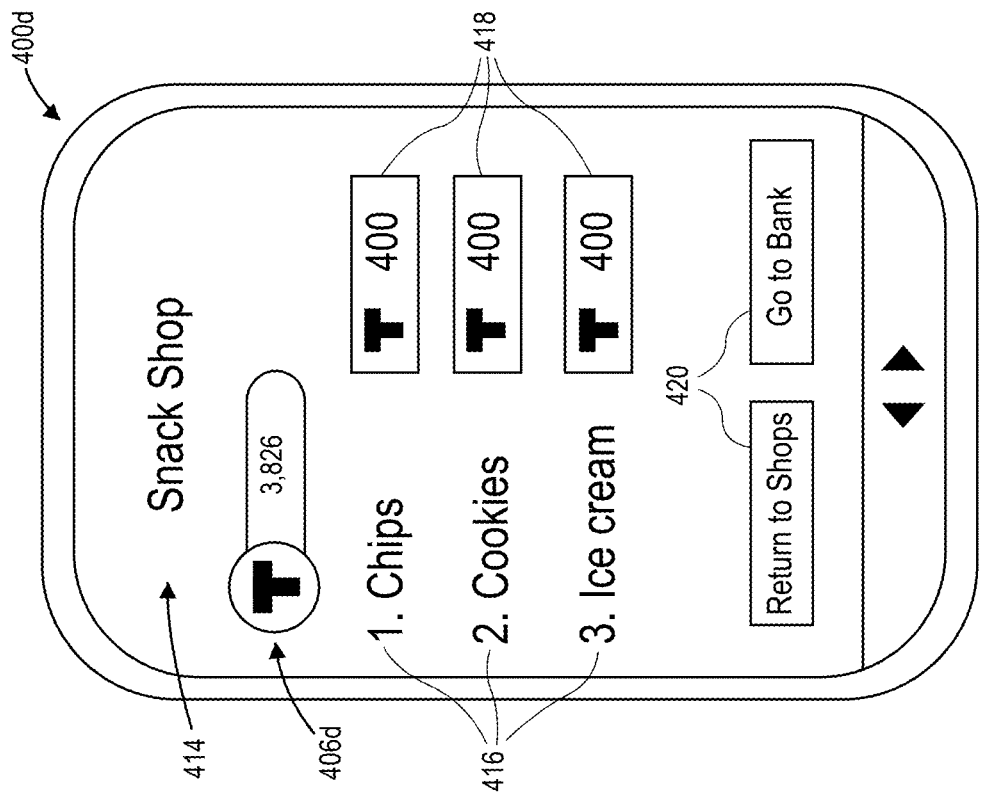
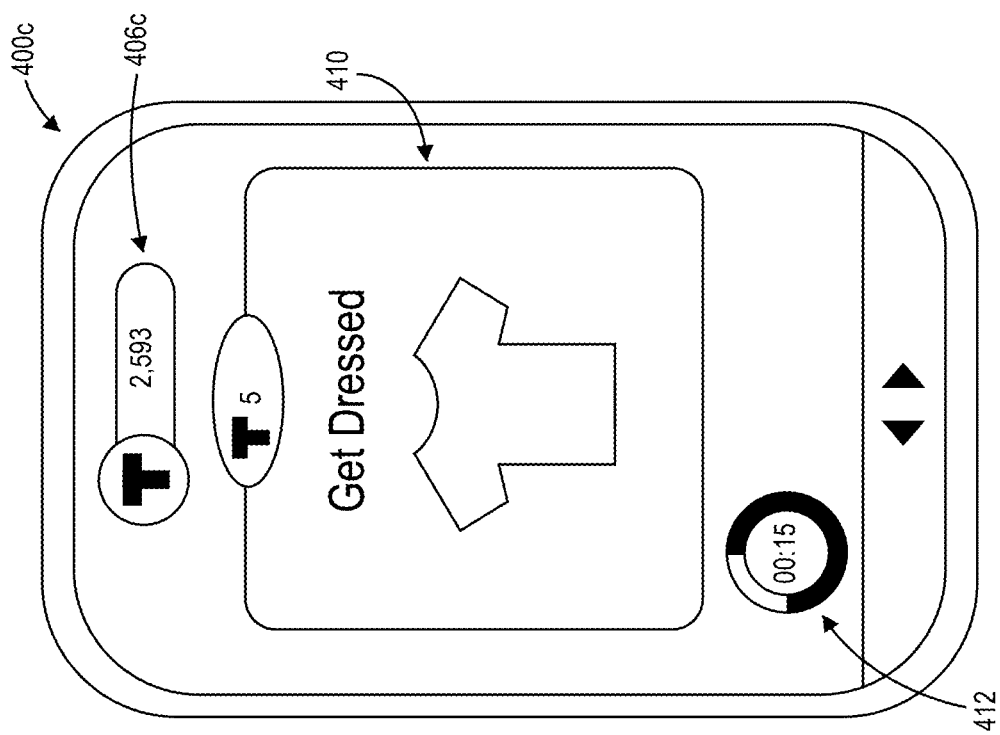
FIG. 4D
FIG. 4C

INTELLIGENT SCHEDULE MANAGEMENT AND ZONE MONITORING SYSTEM

BACKGROUND

1. Field

Embodiments of the present disclosure relate to management systems. More specifically, embodiments of the present disclosure relate to user management hardware systems.

2. Related Art

Oftentimes, children struggle to conform their behavior to the expectations of their parents and the community at large. For example, children may struggle to stay on task when a particular task is asked of them, such as the task of completing their homework. Thus, it is often the responsibility of parents, teachers, and supervisors to monitor and correct the behaviors and actions of children when they do not fall within certain expectations. For example, if a parent witnesses their child become engaged in a physical altercation with another child, that parent may wish to let the child know that their behavior was wrong. This may be difficult, as many parents struggle to provide effective feedback to their children on how well their behavior is conforming to expectations in a way that a child may be receptive to. Thus, there is a need for a better way for parents to provide feedback to their children in an effective manner.

Additionally, in our increasingly digital world, children of all ages often have access to electronic devices, such as cellular phones. Children may have a large portion of their attention and lives tied to such devices. While this is often seen as a negative thing, an opportunity exists to leverage the attention children give to electronic devices for other beneficial purposes. In the present disclosure, systems and methods for parents to monitor and correct the behaviors of children through the use of electronic devices are presented. More specifically, a management system and associated hardware for providing real-time feedback to a user are presented.

SUMMARY

In some aspects, the techniques described herein relate to a system for management of a user, the system including: a behavior management module operable to receive an input associated with a behavior of the user; a schedule management module operable to present the user with a plurality of tasks; an incentive module including a set of currency associated with an account of the user; a beacon device located in an environment occupied by the user; and a graphical user interface operable to present an application associated with the system to the user.

In some aspects, the techniques described herein relate to a system, wherein the behavior management module includes a plurality of zones.

In some aspects, the techniques described herein relate to a system, wherein the behavior management module is operable to assign a zone from the plurality of zones to the account associated with the user after receiving the input.

In some aspects, the techniques described herein relate to a system, wherein each zone in the plurality of zones is indicated by a color presented by the graphical user interface.

In some aspects, the techniques described herein relate to a system, wherein the beacon device is further operable to emit the color of each zone of the plurality of zones.

In some aspects, the techniques described herein relate to a system, wherein the beacon device is further operable to indicate, to the user, the input being received.

In some aspects, the techniques described herein relate to a system, wherein the input is received from a supervisor of the user, the user being a child.

In some aspects, the techniques described herein relate to a system for managing a user, the system including: a behavior management module including a plurality of zones, the behavior management module operable to receive an input associated with a behavior of the user from a supervisor; a schedule management module operable to present the user with a plurality of tasks; a beacon device located in an environment occupied by the user; and a graphical user interface operable to present an application associated with the system to the user.

In some aspects, the techniques described herein relate to a system further including: An incentive module operable to store a set of virtual currency and present the user with a set of items to purchase with the set of virtual currency.

In some aspects, the techniques described herein relate to a system, wherein the incentive module includes a machine learning module operable to determine a virtual price for each item in the set of items.

In some aspects, the techniques described herein relate to a system, wherein the beacon device includes a visual interface operable to present the user with the graphical user interface.

In some aspects, the techniques described herein relate to a system, wherein the beacon device includes a speaker operable to indicate to the user when a transition between the plurality of zones occurs.

In some aspects, the techniques described herein relate to a system, wherein the beacon device is operable to present the user with the plurality of tasks.

In some aspects, the techniques described herein relate to a system, wherein the beacon device includes a camera operable to record the environment occupied by the user.

In some aspects, the techniques described herein relate to a method for user management using a beacon device, the method including: presenting a set of user management information to a user via the beacon device; receiving an input, the input relating to a behavior of the user; transitioning an account associated with the user to a zone; receiving, by the beacon device, a zone status update; and indicating, via the beacon device, the zone status update.

In some aspects, the techniques described herein relate to a method further including: storing the set of user management information in a data store, the data store being internal to the beacon device.

In some aspects, the techniques described herein relate to a method, wherein the zone status update is indicated via a color change, wherein the color change is a color associated with the zone.

In some aspects, the techniques described herein relate to a method, wherein the input is received from a supervisor client device associated with a supervisor.

In some aspects, the techniques described herein relate to a method, wherein the beacon device includes a touch screen operable to receive the input.

In some aspects, the techniques described herein relate to a method, wherein the set of user management information includes a graphical user interface associated with a user management system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIGS. 4A-4D depict exemplary user interfaces for a user management system in accordance with embodiments of the invention.

Figure 1:
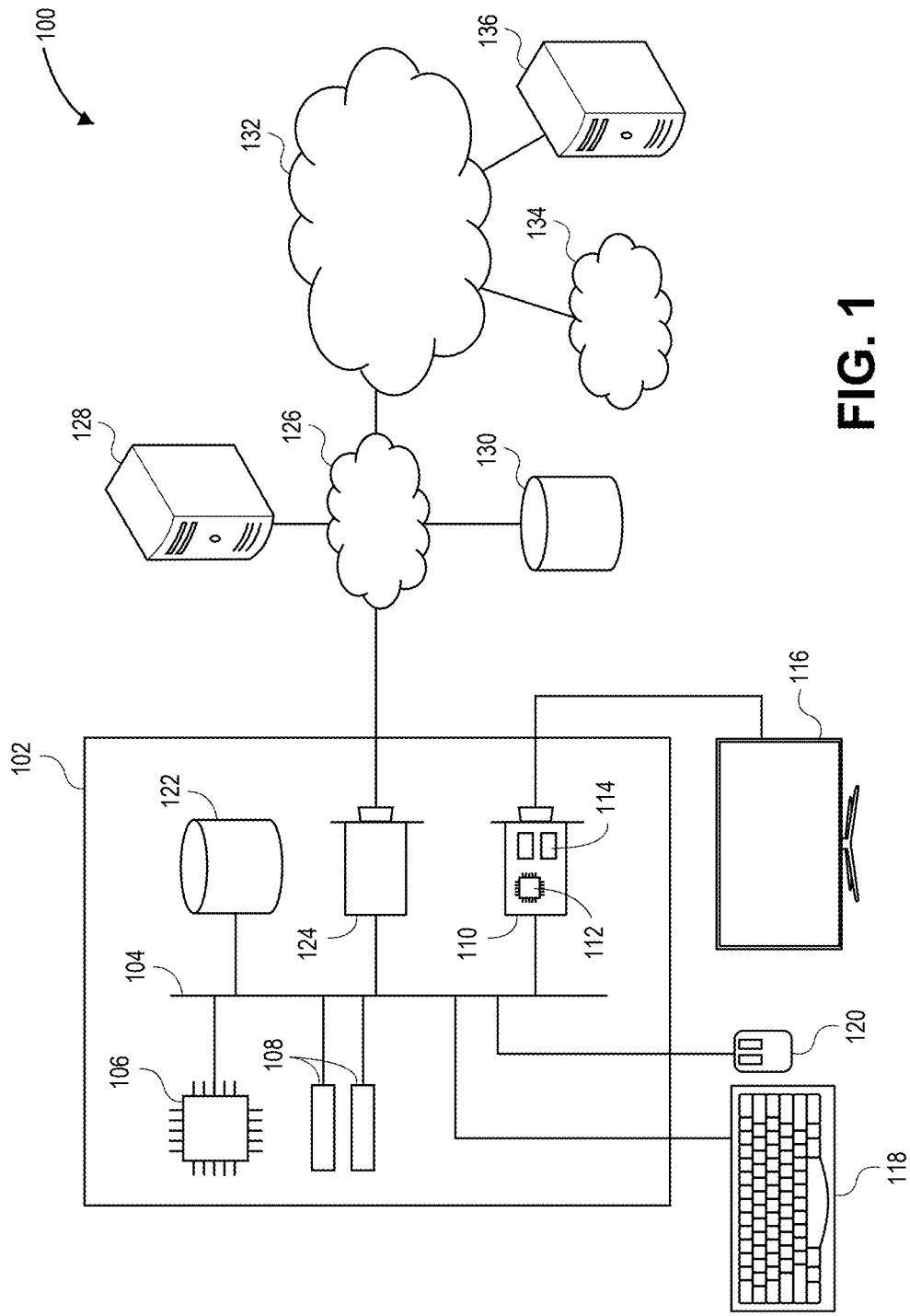
FIG. 1 depicts an exemplary hardware system in accordance with embodiments of the invention.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

The embodiments of the present disclosure are generally related to systems for user management. In some embodiments, a user management system includes a behavior management module, a schedule management module, and an incentives module. The behavior management module may include a plurality of zones corresponding to various behaviors and characteristics of a user. The behavior management module may be operable to receive input from a supervisor of the user and manage the zone associated with an account of the user based on the input. The schedule management module may present a user with a plurality of tasks to be completed by the user. The schedule management module may interface with the behavior management module to modify the zone associated with the user upon completion or lack of completion of any number of tasks. The incentives module may provide virtual currency and virtual goods to incentivize certain behaviors and actions from a user.

The user management system may interface with a beacon device to provide environmental feedback and monitoring of a user. Accordingly, the beacon device may indicate any number of zone status changes to the user via light, color, sound, vibration, and the like. The beginning device may include a speaker module, camera module, microphone module, and visual interface module to receive input from and provide feedback to a user. The beacon device may present a user with a graphical user interface for viewing the schedule management system without the use of a client device.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Such non-transitory computer-readable media include both volatile and nonvolatile media, removable and nonremovable media, and contemplate media readable by a database. In particular, computer-readable media include computer-readable media storing computer-executable instructions that, when executed by a processor, perform certain methods in accordance with embodiments of the invention. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
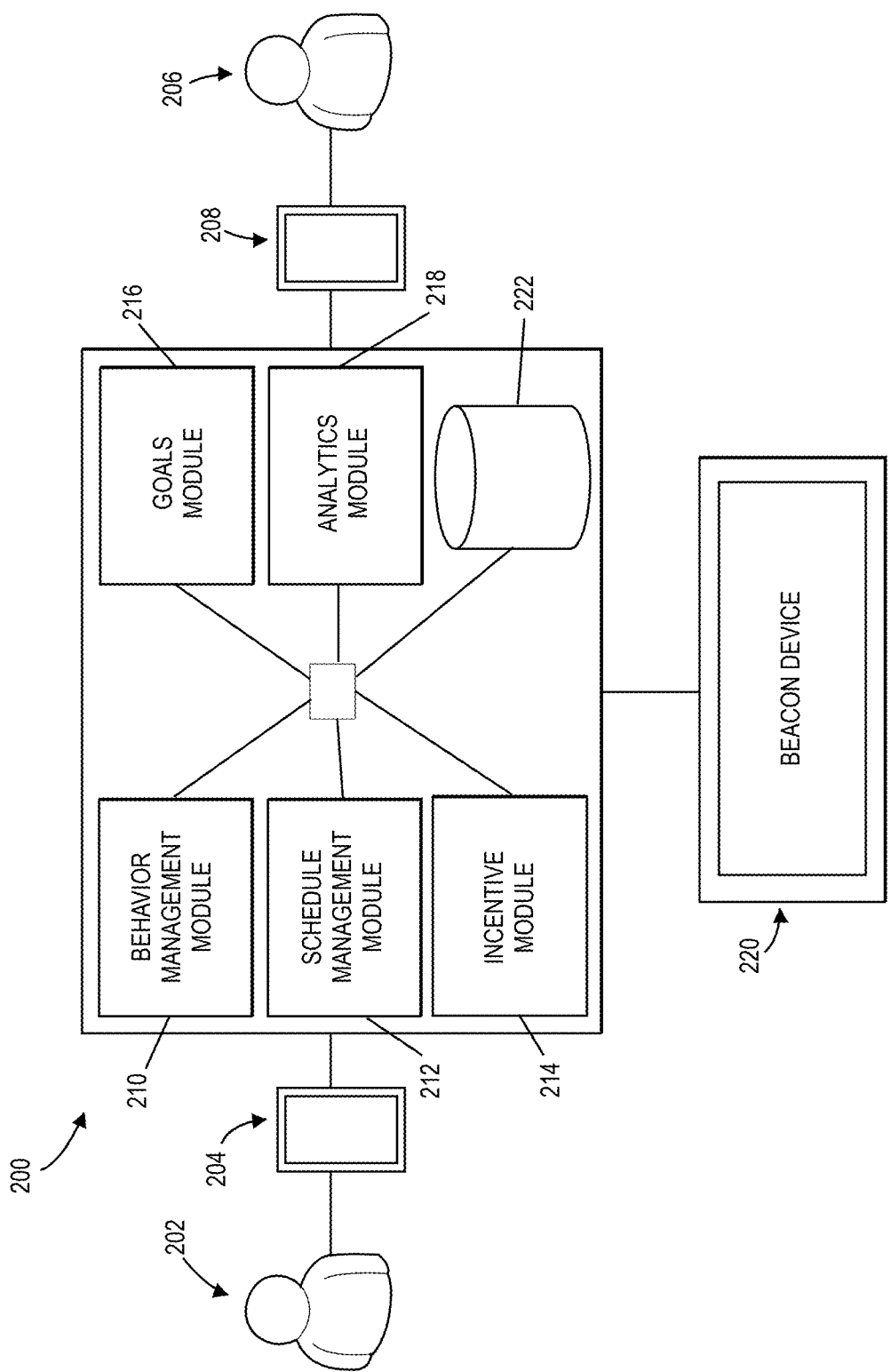
FIG. 2 depicts an exemplary application and hardware system for user management in accordance with embodiments of the invention.

FIG. 2 depicts an exemplary system for user management in accordance with embodiments of the invention. At a high level, user management system 200 may be an application framework for the monitoring of a user's behavior and schedule by a supervisor. More specifically, user management system 200 may receive information regarding the actions and/or behaviors of user 202 and present a visual representation of the user's behavior and schedule to user 202. As such, user management system 200 may interface with user 202 through user client device 204 and supervisor 206 through supervisor client device 208. It is noted herein that user client device 204 and supervisor client device 208 may be any client devices now known or later developed suitable for interfacing with user management system 200, including, but not limited to, a computer, a tablet, a cell phone, a smart device, and the like.

Broadly, user 202 may be any person or entity that engages in the monitoring of behavior as the person or entity being monitored. In some embodiments, user 202 may be a person or entity subordinate to and/or monitored by supervisor 206. For example, user 202 may be a child that a parent and/or teacher wishes to monitor. For example, user 202 may be an eight-year-old child with behavioral issues whose parent wishes to monitor and correct their behavior. In some embodiments, user 202 may be a group of people, such as a group being monitored by supervisor 206 and participating in a group behavior exercise.

Further, supervisor 206 may be any person or entity now known or later developed that may use supervisor client device 208 to monitor user 202 including, but not limited to, teachers, parents, leaders, therapists, instructors, guardians, administrators, and similar people. Supervisor 206 may oversee and/or implement the presentation of user management system 200 to user 202. For example, supervisor 206 may enable user management system 200 to transition the account associated with user 202 between the various zones in behavior management module 210 (discussed below).

In some embodiments, supervisor 206 may implement the presentation of user management system 200 based on instruction given to user 202 externally from user management system 200. For example, supervisor 206 may change the presentation of user management system 200 to user 202 after orally communicating to user 202 to "clean your room." Accordingly, user management system 200 may present a new task using schedule management module 212 for cleaning the room of user 202. In other embodiments, supervisor 206 may implement the presentation of user management system 200 based on instructions given to user 202 using various components of user management system 200. For example, supervisor 206 may change the presentation of user management system 200, such as by initiating the transition of the account of user 202 from one zone of another to another zone, when user 202 does or does not complete the tasks presented by schedule management module 212.

In some embodiments, user management system 200 may include behavior management module 210. At a high level, behavior management module 210 may provide real-time feedback to user 202 on how well the behavior of user 202 conforms with the expectations set by supervisor 206. For example, if a parent wishes to correct their child's behavior of hitting other children, the parent may interface with behavior management module 210 to inform user 202 (their child) that their behavior is inappropriate when they hit another child. Accordingly, behavior management module 210 may transition an account associated with user 202 from a first zone to a second zone to indicate to the child that their behavior does or does not conform to the expectations of supervisor 206.

In some embodiments, behavior management module 210 may receive input from supervisor 206. For example, supervisor 206 may provide behavior management module 210 with an indication that user 202 has engaged in a particular behavior, such as throwing a rock on the playground. In some embodiments, behavior management module 210 may receive input from various systems of user client device 204. For example, behavior management module 210 may receive input indicating that user 202 has opened a particular application on user client device 204, such as a social media application. In some embodiments, behavior management module 210 may receive input from beacon device 220. For example, behavior management module 210 may receive a video feed from beacon device 220 depicting user 202 engaging in a particular behavior. In some embodiments, behavior management module 210 may receive input from user 202. For example, behavior management module 210 may receive input from user 202, the input indicating that user 202 has completed a certain task presented by schedule management module 212.

In some embodiments, behavior management module 210 may include a plurality of zones. Broadly, a zone may be a status on an account associated with user 202 indicating what behaviors and/or actions user 202 is presently engaging in. Put another way, the plurality of zones may correspond to categories of behaviors of user 202, such as if a user is engaging in a particular classification of behavior (e.g., a good behavior, a bad behavior, etc.). For example, when user 202 is engaging in a desirable behavior, user 202 may be in a first zone, and when user 202 is engaging in an undesirable behavior (as defined by supervisor 206), user 202 may be in a second zone. For another example, if a parent acting as supervisor 206 views their child (user 202) hitting another child, supervisor 206 may provide an input to behavior management module 210 indicating that the account associated with user 202 should be transitioned from a first zone to a second zone. Accordingly, user 202 may be provided with a visual indication that their account has been transitioned from a first zone to a second zone, informing user 202 that they have engaged in a particular behavior that is undesirable.

Behavior management module 210 may receive input from any number of sources in order to determine which zone to put the account associated with user 202 in. In some embodiments, user 202 may determine which zone to assign to the account associated with user 202 through the manual intervention of supervisor 206. For example, supervisor 206 may input information into behavior management module 210 such that behavior management module 210 determines a zone for the account associated with user 202. In some embodiments, behavior management module 210 may determine which zone to put an account associated with user 202 based on internal information. For example, if a predetermined amount of time passes in which the account associated with user 202 is in a particular zone, behavior management module 210 may automatically transition the account associated with user 202 to a different zone. In some embodiments, behavior management module 210 may determine which zone to put an account associated with user 202 based on input received from user client device 204. For example, if user 202 opens a particular application on user client device 204, behavior management module 210 may determine which zone to put the account associated with user 202 based on that action.

In some embodiments, the zone in which user 202 resides may be indicated to user 202 through user client device 204 via a color. For example, user 202 may be presented with an application with a green-colored GUI when the account associated with user 202 is in a first zone and a red-colored GUI when the account associated with user 202 is in a second zone. As such, user 202 may be able to determine whether they have engaged in a particular behavior based on the color of one or more components of the GUI of user management system 200. In some embodiments, the color indication may be presented in the background component of the GUI associated with user management system 200 presented to user 202 through user client device 204.

In some embodiments, user 202 may be subject to a particular time restriction based on the zone they are in. For one example, user 202 may be assigned a task that must be completed before a certain time of day. For another example, user 202 may be assigned a task that must be completed in a predetermined amount of time. For another example, user 202 may be assigned a task that must be performed for a predetermined duration, such as reading a book for 20 minutes. In some embodiments, user 202 may not be subject to any time restrictions for completing a certain task during the day.

In some embodiments, the zone in which user 202 resides may influence or be influenced by other components of user management system 200, such as schedule management module 212 and incentive module 214. For example, a balance of virtual currency, as discussed below with respect to incentive module 214, may increase by a predetermined amount if the account associated with user 202 is transitioned to a particular zone. For another example, a particular number of tokens may be added to an account associated with user 202 for every predetermined period of time the account associated with user 202 spends in a particular zone. In other words, by maintaining the behavior in a desired zone, the user earns that number of tokens, which can be later redeemed, as discussed below. For still another example, behavior management module 210 may transition an account associated with user 202 to a different zone based on input received from schedule management module 212, such as whether or not the user 202 has completed a particular task.

As discussed above, behavior management module 210 may include any number of zones. By way of example, behavior management module 210 may include four zones. In some embodiments, a first zone may be dedicated to when the behavior of user 202 conforms to the inputted expectations of supervisor 206 as well as the elements of schedule management module 212. In some embodiments, a second zone may be dedicated to periods when the behavior of user 202 does not conform with the expectations of supervisor 206 and/or user 202 fails to complete the tasks of schedule management module 212. In some embodiments, a third zone may be dedicated to providing user 202 with a warning that their behavior may be non-conformant with the behaviors or actions expected by supervisor 206. In some embodiments, a fourth zone may be dedicated to when user 202 is not expected to be engaging in any monitored behavior. For example, supervisor 206 may determine that user 202 should not be monitored for a particular period of time. As such, supervisor 206 may manually transition the account associated with user 202 to a zone that puts user management system 200 in suspension.

Behavior management module 210 may interface with incentive module 214. Broadly, incentive module 214 may provide various elements to user 202 that reward the behavior of user 202 and/or incentivize user 202 to engage in various behaviors. For example, incentive module 214 may allow user 202 to trade in virtual currency or tokens received for spending time in particular zones in exchange for real-world items or other incentives, such as a trip to the park or candy.

In some embodiments, user 202 may accrue virtual currency at a predetermined rate, as defined by incentive module 214, when in a particular zone. For example, user 202 may accrue virtual currency at a rate of 10 coins per minute while in a zone associated with desirable behavior. In some embodiments, incentive module 214 may utilize a machine learning model to determine the rate at which currency accrues for user 202, such as the rate at which currency accrues across the various behavior zones. For example, incentive module 214 may use a machine learning model to determine the rate of accrual of currency which optimizes the responsiveness of user 202. For example, the machine learning model may determine that user 202 is the most likely to change their behavior to switch from a first zone to a second zone when the user doesn't accrue any currency in the first zone but accrues currency at a rate of 10 coins per minute in the second zone.

In some embodiments, incentive module 214 may include a virtual marketplace offering incentive items. The virtual marketplace may include any number of items. The items provided in the virtual marketplace may be added by supervisor 206 and/or automatically generated by the system. In some embodiments, incentive module 214 may use machine learning to price items within the virtual market. For example, incentive module 214 may use machine learning to determine the most-preferred items for a user (e.g., items that have the highest motivational value, provide the greatest incentive, etc.), such that the incentive module 214 may then increase the price of the most-preferred items in order to encourage behavior change or desired behaviors. For another example, incentive module 214 may use machine learning to determine when items are priced right, underpriced, or overpriced according to various factors, such as whether a user purchases or doesn't purchase a particular item. In some embodiments, incentive module 214 may be unmodifiable to supervisor 206 in order to prevent supervisor 206 from making certain modifications, such as to the price of items. In other embodiments, incentive module 214 may have limited modifiability to allow supervisor 206 some ability to customize item prices without allowing prices that are too low or too high to effectively incentivize desired behaviors.

The machine learning model used by incentive module 214 may be trained using any relevant training data sets, including, but not limited to, user analytics, behavior research, platform analytics, economic models, user history, and the like. In some embodiments, the machine learning model is trained based on data from additional users as well as data from user 202. The machine learning model may be any type of machine learning model now known or later developed, including, but not limited to, unsupervised learning models, supervised learning models, reinforcement learning models, and the like.

In some embodiments, incentive module 214 may include a virtual banking system. In some embodiments, the virtual banking system may provide a means by which virtual currency may be exchanged with physical currency. For example, the virtual banking system may allow user 202 to exchange a predetermined amount of virtual currency for a predetermined amount of physical currency, which may be provided by user management system 200 and/or supervisor 206. Further, the virtual banking system may provide the ability for user 202 to invest and/or save their virtual currency.

In some embodiments, behavior management module 210 may interface with incentive module 214 to impose a restriction on incentives. For example, behavior management module 210 may interface with incentive module 214 to impose a "tax" and/or increase the virtual price of items in the virtual market. In such embodiments, behavior management module 210 may use restrictions in order to reinforce certain behavioral corrections. For example, if user 202 does not complete a certain number of tasks imposed by schedule management module 212, behavior management module 210 may impose a tax on all items provided by incentive module 214 for a predetermined or adjustable interval in order to provide a consequence to user 202. In some embodiments, schedule management module 212 may interface with incentive module 214 in order to provide a consequence to user 202, such as adding additional tasks for user 202 in order to replace, reinforce, or correct behaviors. In some embodiments, a restriction on incentives may be received/imposed by supervisor 206. For example, supervisor 206 may direct behavior management module 210 to impose a restriction on incentives received by user 202 because of a behavior of user 202 observed by supervisor 206. For another example, if supervisor 206 witnesses user 202 becoming physically aggressive with another person, supervisor 206 may prompt behavior management module 210 to impose a restriction on incentives available to user 202 and/or assign an additional task to user 202.

In some embodiments, user management system 200 may include a schedule management module 212. At a high level, schedule management module 212 may provide a means by which user 202 can see the schedule defined for them by supervisor 206 to determine what action needs to be done, when it needs to be done, how it needs to be done, and the like. Further, schedule management module 212 may interface with incentive module 214 to provide an incentive in the form of virtual currency for each item completed. For example, incentive module 214 may reward user 202 with an amount of virtual currency when user 202 completes a task assigned by supervisor 206. Incentive module 214 may increase the accrual rate of the virtual currency proportionally to the number of tasks completed by user 202 (e.g., the user is awarded more currency per task completed as the number of tasks completed increases).

In some embodiments, schedule management module 212 includes any number of tasks. The tasks may encompass any item that could be done by a user. The tasks may be defined by supervisor 206, or schedule management module 212 may automatically generate the tasks using machine learning. For example, schedule management module 212 may use machine learning to learn the daily schedule of user 202, what user 202 struggles with, and the like, and create a daily schedule that achieves some predetermined goal set by supervisor 206, such as a goal to challenge user 202 to get more exercise or spend more time resting and engaging in quiet activities. In some embodiments, tasks may have levels of difficulty associated with them. For example, a task may be labeled as "easy," "hard," or any other label indicating difficulty by supervisor 206 based on the perceived level of difficulty. In such embodiments, the rewards associated with the tasks may be increased or decreased based on the set difficulty. In some embodiments, schedule management module 212 may interface with incentive module 214 to set a reward associated with a particular task based on the level of difficulty associated with the task. For example, tasks labeled as "hard" may have a more valuable award as opposed to tasks labeled as "easy." In some embodiments, incentive module 214 may use machine learning to determine the virtual currency value of completing a certain task. For example, incentive module 214 may determine the value of completing a certain task by evaluating the difficulty of the task and/or what reward amounts user 202 is typically responsive to. In some embodiments, supervisor 206 may be prevented from modifying the level of difficulty of a task and/or the reward of the task. For example, supervisor 206 may be prevented from decreasing the reward for task completion set by incentive module 214.

In some embodiments, user management system 200 may include a goals module 216. Goals module 216 may provide user 202 with one or more goals in order to improve performance of user 202. For example, goals module 216 may provide user 202 with goals that inform user 202 of the performance expectations of supervisor 206 and the rewards associated with meeting expectations of supervisor 206. A goal may be defined as any metric that may be used to evaluate the performance of user 202 to determine if user 202 fell short of, met, or exceeded the metric. A goal may be repeated over time and have a "goal streak" which defines the number of time user 202 has met the goal in a row. In some embodiments, supervisor 206 inputs goal information to be used by goals module 216. For example, supervisor 206 may set a goal for user 202 of "completing all daily tasks for 3 consecutive days." In some embodiments, goals module 216 may interface with behavior management module 210 to define goals related to the behavior of user 202. For example, goals module 216 may provide a user with a goal to remain in a particular behavior zone for an entire day. In some embodiments, goals module 216 may interface with schedule management module 212 to define goals related to the tasks associated with user 202. For example, goals module 216 may define a goal for user 202 to "complete the 'brush your teeth' task for an entire week."

In some embodiments, the goals defined by goals module 216 may include a difficulty rating. For example, as discussed above with regard to schedule management module 212, a goal may have an indicator of how difficult the goal may be to meet by user 202. Goals module 216 may determine the difficulty of a goal (e.g., by using machine learning) by evaluating any number of criteria, including, but not limited to, how often user 202 reaches a particular goal, the underlying difficulty of the tasks associated with the goal, and other similar criteria. In some embodiments, supervisor 206 may interface with goals module 216 to set the difficulty of a particular goal.

In some embodiments, goals module 216 may interface with incentive module 214 to provide user 202 with a reward for completing a goal. For example, user 202 may receive a predetermined amount of virtual currency for meeting and/or exceeding a goal. For another example, the rate at which a virtual currency accrues may increase as the goal streak associated with a goal increases. In some embodiments, supervisor 206 may define the incentive associated with meeting a particular goal. For example, supervisor 206 may define a reward of "going out for ice cream" if user 202 completes a goal set by supervisor 206. In some embodiments, incentive module 214 may determine the reward associated with a goal based on the defined difficulty of the goal. For example, easier goals may receive less virtual currency for completion than harder goals.

In some embodiments, user management system 200 may include an analytics module 218. Broadly, analytics module 218 may aggregate and analyze information regarding the interaction of user 202 with user management system 200. The information gathered and analyzed may then be used by user 202 and/or supervisor 206 as feedback on any number of items, including, but not limited to, performance, behavior, schedule management, supervision tactics, and the like. For example, analytics module 218 may collect data associated with the interaction of user 202 with behavior management module 210, schedule management module 212, incentive module 214, goals module 216, and the like. The information gathered may be analyzed to determine patterns and observations. For example, the information gathered from behavior management module 210 and schedule management module 212 may be analyzed to determine how much time user 202 spent in each zone for a particular week and what tasks were likely to transition user 202 from one zone to another. Analytics module 218 may then determine suggestions to present to user 202 and supervisor 206 based on the information analyzed. In some embodiments, analytics module 218 may present the collected and/or analyzed information, observations, and suggestions to user 202 and/or supervisor 206.

In some embodiments, user management system 200 may interface with beacon device 220. Beacon device 220 generally corresponds to beacon device 316 described in more detail below. Generally, beacon device 220 may provide an alternative or additional means of interacting with user management system 200. For example, beacon device 220 may provide indicators when the conduct of user 202 results in the transitioning to a new zone associated with a user account. For another example, beacon device 220 may present user 202 with feedback from analytics module 218. In some embodiments, beacon device 220 may receive input from user 202 from a touch screen, from a microphone, or from any other input mechanisms, such as a keyboard. Broadly, beacon device 220 may be located in an environment occupied by user 202. As such, user 202 can be monitored by and/or interface with beacon device 220 in addition to or alternatively from user client device 204.

In some embodiments, all information associated with user management system 200 may be stored in data store 222. Broadly, data store 222 may house data associated with the user management system, including, but not limited to, system configuration data, user account information, graphical user interface information, behavior management module information, schedule management module information, incentive module information, goals module information, analytics module information, beacon device information, and any other information. Data store 222 may be a singular data store or a plurality of data stores, either external and/or internal to user management system 200.

It is contemplated herein that user management system 200 may include any number of additional features, associated applications, interfaces, and the like. The interface and accounts of user management system 200 may be customizable, allowing user 202 and/or supervisor 206 to customize avatars associated with their account(s). Further, user management system 200 may include social media modules, allowing user 202 to engage with additional users of the application. For example, user management system 200 may include a chat feature to allow multiple users to chat with one another. For another example, user management system 200 may include a leaderboard and other competition systems for multiple users to compare their performance with the performance of other system users.

Figure 3:
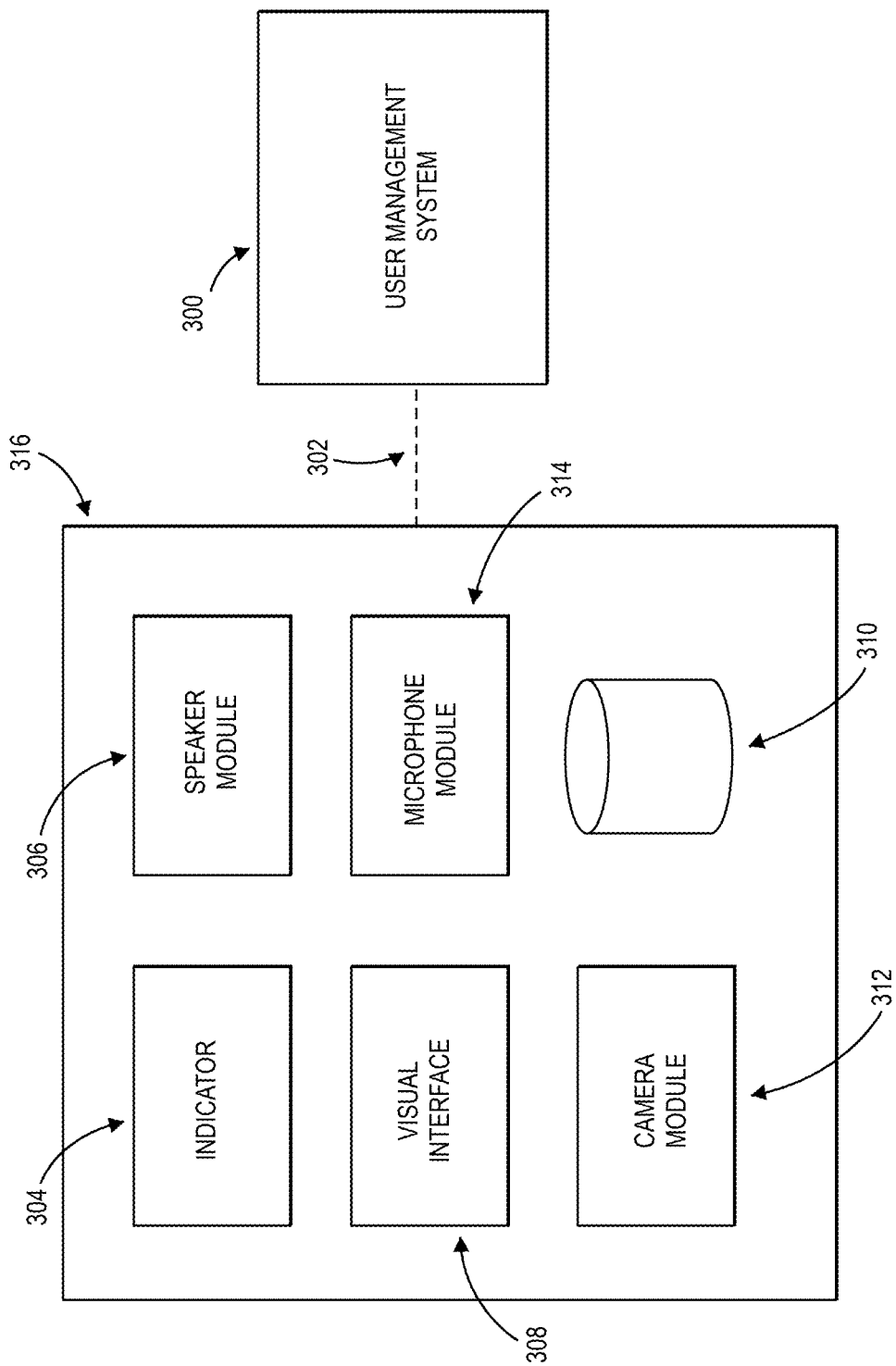
FIG. 3 depicts an exemplary hardware system for user management in accordance with embodiments of the invention.

Continuing on, FIG. 3 depicts an exemplary hardware system for user management in accordance with embodiments of the invention. At a high level, beacon device 316, generally corresponding to beacon device 220 depicted in FIG. 2, may be a hardware device in a user's environment that allows the user to interact with user management system 300, generally corresponding to user management system 200 depicted in FIG. 2. For example, beacon device 316 may present the user with any information the user may access in an application associated with the user management system 300.

In some embodiments, beacon device 316 may be accessed by an individual user; However, it is contemplated herein that beacon device 220 may be accessed by multiple users, groups, and multiple accounts as well. For example, if beacon device 316 is located in a home with multiple children, beacon device 316 may be used by multiple children with separate accounts in order to monitor their individual accounts.

Beacon device 316 may be connected to user management system 300 through communication link 302. Communication link 302 may be any suitable means now known or later developed for two platforms to communicate, including, but not limited to, a wired connection, a wireless connection, a Bluetooth connection, a WI-FI connection, and any other type of connection.

Generally, beacon device 316 may provide a user, such as user 202, with feedback regarding their behavior and/or actions. In some embodiments, beacon device 316 may include indicator 304. Indicator 304 may notify the user when something has changed regarding user management system 300. For example, indicator 304 may notify a user when the zone associated with their account has changed. In some embodiments, indicator 304 may notify the user through color. For example, beacon device 316 may start off emitting a green light, but when a user performs an undesirable action, beacon device 316 may begin emitting red instead of green. Indicator 304 may notify the user of any number of items in any number of ways, including, but not limited to, through sound, visual cues, vibration, and any other means.

One way in which beacon device 316 may interface with a user is through auditory means. In some embodiments, beacon device 316 may include speaker module 306. Speaker module 306 may allow beacon device 316 to output notifications to a user through spoken language, or any other sounds, such as a ding or a chirp. For example, speaker module 306 may output, "you have been moved into the reflective zone." As such, a user may not be required to see beacon device 316 in order to use it to receive updates regarding user management system 300.

Another way in which beacon device 316 may interface with a user is through visual means. In some embodiments, beacon device 316 may include visual interface 308. In some embodiments, visual interface 308 may include a touch screen. In such embodiments, visual interface 308 may receive input from a user through touch. For example, a user may be able to interact with any and all components of user management system 300, including, but not limited to, a behavior management module, an incentive module, a goals module, an analytics module, and a schedule management module. The user input may include any and all input the user may input into user management system 300, Including input that may alternatively or additionally be received by user management system 300 through user client device 204 depicted in FIG. 2. Also contemplated is a simplified, dedicated beacon device with only three (or two or four) color-coded lights indicating a current behavior zone and an optional speaker for auditory feedback.

Broadly, beacon device 316 may access any information of user management system 300 and present it to the user as described above with respect to the graphical user interface of the application. For example, beacon device 316 may display any and all information that can be displayed through user client device 204 and/or supervisor client device 208. In some embodiments, beacon device 316 may include user management information data store 310. User management information data store 310 may be any type of data store now known or later developed, including, but not limited to, a singular data store, a plurality of data stores, a cloud data store, an internal data store, an external data store, and the like. User management information data store 310 may store any and all information regarding user management system 300 in a space internal to beacon device 316. For example, a user's virtual currency amount may be stored in user management information data store 310 such that it can be quickly accessed and displayed to a user.

In some embodiments, beacon device 316 may monitor the behavior and/or actions of a user. For example, beacon device 316 may behave in a manner similar to supervisor 206 described above with respect to FIG. 2. That is, beacon device 316 may visually and auditorily monitor the user to determine when a behavior has or has not occurred. In some embodiments, beacon device 316 includes camera module 312. In such embodiments, camera module 312 may capture images and/or video of a user and transmit the content to user management system 300. In some embodiments, beacon device 316 may include microphone module 314. In such embodiments, microphone module 314 may capture audio recordings and transmit the content to user management system 300. In response, user management system 300 may analyze the provided content and determine whether action is to be taken in the corresponding behavior management module or schedule management module.

Continuing on, FIGS. 4A-4D depict exemplary user interfaces for a user management system in accordance with embodiments of the invention. Interfaces 400a-400d may generally correspond to the graphical user interfaces described above with respect to FIG. 2 and FIG. 3. To begin, FIGS. 4A-4B depict interface 400a and interface 400b, which may correspond to the visual presentation of two different zones, such as the zones described above with regard to behavior management module 210 depicted in FIG. 2. Interface 400a may include a zone timer 402a. Zone timer 402a may be a stopwatch-like timer that counts up until a zone transition occurs or an amount of time spent in a current zone. Zone label 404a may also be presented on interface 400a. For example, zone label 404a may be "Bonus Zone." In some embodiments, the number of virtual currency units present in a user's account may be displayed, such as with virtual currency display 406a. As discussed above, a particular zone may result in the passive accrual of virtual currency. In some embodiments, any number of action buttons 408a may be presented to a user, including a button to access the bank, a button to access a schedule, a button to take a break, and the like.

Interface 400b may include substantially similar interface elements to interface 400a. But, in some embodiments, the zone may differ such that various interface elements change, such as the background, type of time, and the like. For example, zone timer 402b may countdown instead of up, functioning as a timer that reaches zero. Upon reaching zero, the system may further transition into a different zone. The difference in zone from interface 400a may be reflected in the zone label 404b, "Reflective Zone." In some embodiments, action buttons 408b may be the same, or they may differ depending on the current zone of the user. For example, action buttons 408b may change such that a user is unable to access certain features of the application when in particular zones. In some embodiments, virtual currency may cease to accrue, such that the number displayed in currency display 406b does not change until the zone changes. In some embodiments, the rate at which the virtual currency rate is being accumulated may be displayed, and the accumulation rate may be customized by the supervisor.

Continuing on, FIG. 4C depicts interface 400c, which may be an interface presented by a schedule management module. In some embodiments, interface 400c may include a task card 410, which presents the task to be completed and the reward for completing the task. Interface 400c may include a clock 412 for informing the user on how much time remaining the user has to complete the task. Similarly to interface 400a and interface 400b, the amount of currency a user has may be displayed in currency display 406c. Responsive to a failure to complete the task, the reward may be forfeited and/or a behavior zone may be transitioned from a first zone to a second zone (for example, from a bonus zone to a reflection zone).

Additionally, FIG. 4D depicts interface 400d, which may be an interface element presented by an incentive module. In some embodiments, interface 400d may include shop name 414, shop items 416, shop prices 418, and action buttons 420. A user may select from various items and determine, by referencing currency display 406d, whether they can afford to purchase a particular item. A user may navigate away from a shop page using action buttons 420, such as by returning to the shops or going to the bank.

Figure 5:
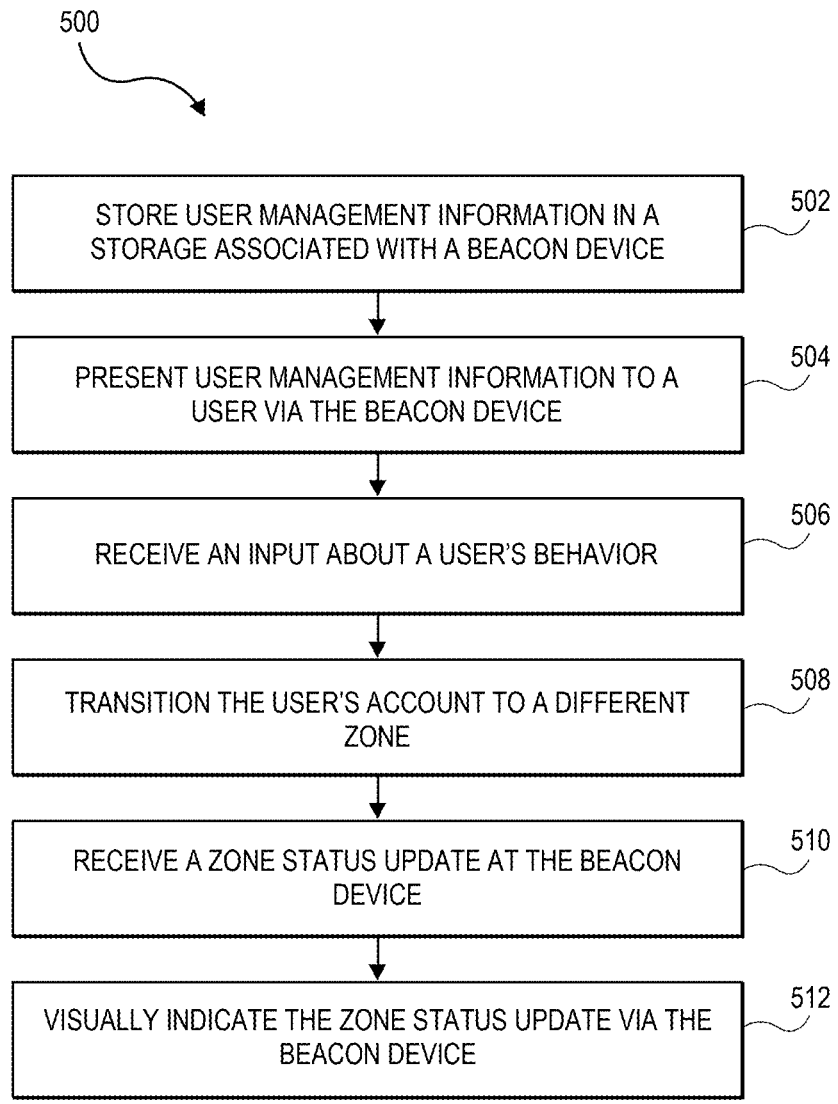
FIG. 5 depicts an exemplary hardware system for user management in accordance with embodiments of the invention.

Finally, FIG. 5 depicts an exemplary method for user management in accordance with embodiments of the invention and is generally referred to as method 500. Generally, method 500 relates to how a change in the zones associated with a user's account are indicated via a beacon device. In step 502, user management information is stored in a data store associated with a beacon device. Broadly, user management information may be any information associated with a user management system. For example, the user management information may include, but is not limited to, user account information, token information, timer information, zone information, graphical user interface information, and the like. In some embodiments, the data store may be internal to the beacon device. In some embodiments, the data store may be internal to a user management system. In some embodiments, the user management information may be stored in the cloud.

In step 504, the user management information is presented to a user via the beacon device. In some embodiments, the user management information may be visually presented to a user via an interface, such as a screen. In some embodiments, the user management information may be auditorily presented to a user, such as through a spoken language via a speaker. For example, the beacon device may output the phrase, "You currently have one hundred tokens." when prompted by a user for their token count.

In step 506, an input about the behavior of a user is received. Behaviors may include any action or lack of action taken by a user, such as a physical action, verbal action, mental action, and the like. In some embodiments, the input may be received from a supervisor via a supervisor client device. For example, a parent of a child may input information when their child does not brush their teeth as asked. In some embodiments, the input may be received from additional components of the beacon device and/or user management system. For example, the input may be imagery or a video clip of the user's behavior received from a video camera, a camera, and/or a microphone attached to the beacon.

In step 508, the user's account is transitioned to a different zone, such as from a first zone to a second zone. For example, if a user behaves in a way indicated as undesirable to the user management system, the user's account may be transitioned from the first zone to the second zone if the second zone is associated with the undesirable behavior occurring. For another example, if a supervisor indicates to the user management system to transition a user to an unmonitored time state, the user's account may be transitioned to a zone associated with unmonitored time, such as the flex zone discussed above with regard to the behavior management module 210 depicted in FIG. 2.

In step 510, the beacon device receives a zone status update. Generally, the zone status update may relate to a change or lack of change in the zone associated with a user's account. In some embodiments, the zone status update is received from a user management system. For example, if a user management system receives an input from a supervisor that results in a zone status change, the user management system may transmit a zone status update to the beacon device. In such embodiments, the zone status update may be transmitted through a wired connection or a wireless connection.

In step 512, the zone status update is indicated via the beacon device. In some embodiments, the zone status update may be indicated via a color change. For example, if the user is transitioned from a first zone to a second zone due to an undesired behavior, the zone status update may be indicated via a color change from green to red. In some embodiments, the zone status update may be indicated via an alternative visual cue, such as through a notification received on the screen of the beacon device. In some embodiments, the zone status update may be indicated via an auditorial cue, such as through a sound being played through a speaker. In some embodiments, the zone status update may be indicated through the use of an external device. For example, the zone status update may be indicated through a vibration on a wrist device worn by a user.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for management of a user account associated with a user, the system comprising:
   a graphical user interface operable to present one or more features of a behavior management module, a schedule management module, and an incentive module to the user;
   the behavior management module operable to perform a behavior zone transition of the user account from a first behavior zone from a plurality of behavior zones to a second behavior zone from the plurality of behavior zones based on internal information,
   wherein, in response to the behavior zone transition, the behavior management module restricts access to at least one feature from the one or more features presented by the graphical user interface;
   the schedule management module operable to present the user with a plurality of tasks and, responsive to an input indicative of a completion of a task by the user, provide a task update to the incentive module;
   the incentive module operable to update a virtual currency balance associated with the user account based on at least one of:
     a first amount of time spent in the first behavior zone and a first predetermined accrual rate when the user account is in the first behavior zone;
     a second amount of time spent in the second behavior zone and a second predetermined accrual rate when the user account is in the second behavior zone, the second predetermined accrual rate being different from the first predetermined accrual rate; or
     the input indicative of the completion of the task by the user; and
   a beacon device located in an environment occupied by the user, the beacon device operable to provide information indicative of the behavior zone transition for the user, wherein the beacon device comprises:
     a camera capturing image data of a behavior of the user in the environment;
     a transmitter transmitting the image data of the behavior to the behavior management module, wherein the internal information comprises the image data;
     one or more light sources emitting a first light indicative of the user account being in the first behavior zone and a second light indicative of the user account being in the second behavior zone, wherein, in response to the behavior management module performing the behavior zone transition, the one or more light sources transition from emitting the first light to emitting the second light; and
a data store storing the virtual currency balance updating at an accrual rate,
wherein, in response to the behavior management module performing the behavior zone transition, the incentive module causes the accrual rate to update from the first predetermined accrual rate to the second predetermined accrual rate.

2. The system of claim 1, wherein the beacon device comprises at least four color-coded behavior zone displays corresponding to the plurality of behavior zones for the user.

3. The system of claim 2, wherein the beacon device further comprises a speaker operable to provide an auditory indication of a transition between the plurality of behavior zones.

4. The system of claim 1, wherein the schedule management module is further operable to provide a different task update to the behavior management module responsive to a failure by the user to complete the task within an associated time limit.

5. The system of claim 1, wherein the beacon device is further operable to indicate, to the user, the input being received.

6. The system of claim 1, wherein the input is based on camera imagery received from the camera of the beacon device.

7. The system of claim 1, wherein the input is received from a supervisor of the user.

8. A system for managing a user account associated with a user, the system comprising:
a graphical user interface operable to present one or more features of a behavior management module, a schedule management module, and an incentive module to the user;
the behavior management module operable to perform a behavior zone transition of the user account from a first behavior zone from a plurality of behavior zones to a second behavior zone from the plurality of behavior zones based on internal information;
wherein, in response to the behavior zone transition, the behavior management module restricts access to at least one feature from the one or more features presented by the graphical user interface;
the incentive module operable to update a virtual currency balance associated with the user account based on at least one of:
a first amount of time spent in the first behavior zone and a first predetermined accrual rate when the user account is in the first behavior zone; and
a second amount of time spent in the second behavior zone and a second predetermined accrual rate when the user account is in the second behavior zone, the second predetermined accrual rate being different from the first predetermined accrual rate;
the schedule management module operable to present the user with a plurality of tasks and responsive to a completion of a task by the user, provide a task update to the behavior management module, the internal information comprising the task update; and
a beacon device operable to display a color-coded indication of a current behavior zone of the plurality of behavior zones for the user and to provide an auditory indication of the behavior zone transition from the first behavior zone to the second behavior zone, the beacon device comprising:
a camera capturing image data of a behavior of the user in an environment;
a transmitter transmitting the image data of the behavior to the behavior management module, wherein the internal information further comprises the image data;
one or more light sources emitting a first light indicative of the user account being in the first behavior zone and a second light indicative of the user account being in the second behavior zone;
wherein, in response to the behavior management module performing the behavior zone transition, the one or more light sources transition from emitting the first light to emitting the second light;
a speaker emitting a sound in response to the behavior zone transition occurring; and
a data store storing the virtual currency balance updating at an accrual rate,
wherein, in response to the behavior zone transition, the incentive module causes the accrual rate to update from the first predetermined accrual rate to the second predetermined accrual rate.

9. The system of claim 8,
wherein the incentive module is further operable to update the virtual currency balance associated with an account of the user based on the completion of the task by the user.

10. The system of claim 9, wherein the incentive module includes a marketplace offering a plurality of incentive items in exchange for virtual currency.

11. The system of claim 10,
wherein the incentive module further includes a machine learning module operable to determine at least one of:
a virtual currency price for at least one item in the plurality of incentive items; or
the accrual rate of the virtual currency associated with each behavior zone in the plurality of behavior zones.

12. The system of claim 8, wherein the beacon device includes a visual interface operable to present the user with the graphical user interface.

13. The system of claim 12, wherein the visual interface of the beacon device is operable to present the user with the plurality of tasks.

14. The system of claim 8, wherein the beacon device includes a microphone operable to record the environment occupied by the user.

15. A method for behavior management of a user account associated with a user via a beacon device, the method comprising:
capturing, via a camera of the beacon device, image data of a behavior of the user in an environment;
transmitting, via a transmitter of the beacon device, the image data of the behavior;
emitting, via one or more light sources of the beacon device, a first light indicative of the user account associated with the user being in a first behavior zone and a second light indicative of the user account being in a second behavior zone;
storing, via a data store of the beacon device, a virtual currency balance updating at an accrual rate, the accrual rate based on a current behavior zone;

presenting, via a graphical user interface of the beacon device, one or more features of an application associated with the beacon device and the user account to the user;

receiving, by a behavior management module associated with the beacon device, an input relating to the behavior of the user from the beacon device, the input comprising the image data;

performing, by the behavior management module, a behavior zone transition of the user account from the first behavior zone to the second behavior zone based on analysis of the input from the beacon device;

responsive to the behavior zone transition, changing, by an incentive module associated with the beacon device, the accrual rate of a virtual currency for the user account, the accrual rate being a first predetermined accrual rate when the user account is in the first behavior zone and a second predetermined accrual rate when the user account is in the second behavior zone, the second predetermined accrual rate being different from the first predetermined accrual rate;

responsive to the behavior zone transition, updating, by the incentive module, a balance of the virtual currency for the user account based on an amount of time in the first behavior zone;

receiving, by the beacon device, a zone status update comprising the behavior zone transition;

responsive to the behavior zone transition, restricting, by the beacon device, access to at least one feature from the one or more features presented by the graphical user interface; and responsive to the behavior zone transition, transitioning, by the beacon device, a current light being emitted by the one or more light sources of the beacon device from the first light to the second light.

16. The method of claim 15, wherein the input indicates one of a completion of a task or a failure to complete the task by the user within a predetermined period.

17. The method of claim 16, further comprising:
updating the balance of the virtual currency associated with the user responsive to the input, wherein the input indicates the completion of the task.

18. The method of claim 15, wherein the input is received from a supervisor client device associated with a supervisor.

19. The method of claim 15,
wherein the first light is associated with a first color and the second light is associated with a second color.

20. The method of claim 15, further comprising:
receiving, from the user, a selection of an incentive item in exchange for a predetermined amount of the virtual currency and, responsive to the selection, updating the balance of the virtual currency associated with the user.

* * * * *